United States Patent Office 3,188,286
Patented June 8, 1965

3,188,286
HYDROCRACKING HEAVY HYDROCARBON OIL
Roger P. Van Driesen, Hopewell, N.J., assignor, by mesne assignments, to Cities Service Research and Development Company, a corporation of Delaware
Filed Oct. 3, 1961, Ser. No. 142,629
3 Claims. (Cl. 208—108)

This invention relates to the treatment of hydrocarbon oils with catalyst and more particularly to treatment of liquid hydrocarbon oil with finely divided catalyst and hydrogen. The invention has particular application to treatment of heavy hydrocarbon oil with finely divided catalyst in the presence of hydrogen.

It is well known to treat liquid hydrocarbon oils in the presence of various catalysts and under varying conditions in order to achieve varying types of conversion reactions. In many hydrocarbon conversion reactions, such as the hydrogenation of hydrocarbon oil, the use of finely divided catalyst produces significantly better results than the use of larger catalyst particles. Most prior processes for the hydrogenation of hydrocarbon oils have involved circulating the feed oil through a fixed bed of catalyst in the presence of hydrogen and under conditions of temperature and pressure adapted to effect the desired degree and type of conversion and hydrogenation. Fixed bed operations of this type have usually suffered from disadvantages such as channeling of the liquid feed through the bed, non-uniform heating of the catalyst bed due to the exothermic nature of the reactions taking place, etc. In addition, since the catalyst normally becomes at least partially deactivated in use, it has been necessary to make special provision for withdrawal of spent catalyst from the reactor so that it might be regenerated or replaced.

To cope with the above mentioned disadvantages of fixed bed operation, various processes have been devised in which the catalyst and liquid feed have been passed through the hydrogenation zone together. While avoiding many of the disadvantages of fixed bed operation, these processes have suffered from an inability to obtain an efficient separation of liquid product from catalyst particles. This is especially true where the catalyst is employed in finely divided form, such as when the catalyst is in the form of particles having a size range below about 300 microns. It is an object of the present invention to provide an improved process for the treatment of liquid hydrocarbon oils in the presence of finely divided catalyst and hydrogen in which this difficulty is substantially overcome.

It is another object of the present invention to provide an improved process for hydrocracking heavy liquid hydrocarbon oil in the presence of finely divided catalyst.

According to a preferred embodiment of the present invention, heavy hydrocarbon oil is flowed upwardly through a liquid phase reaction zone containing finely divided catalyst in the presence of added hydrogen. The reaction zone contains at least about 10 volume percent catalyst and is maintained under suitable hydrocracking conditions to convert at least a portion of the heavy feed oil into lighter material. In order to replace spent catalyst, finely divided catalyst is continuously added to the reaction zone at rates between about 0.02 and about 0.5 pound of catalyst per barrel of feed. Simultaneously, catalyst is withdrawn from the reaction zone together with liquid product at the same rate at which catalyst is being added to the reaction zone. The liquid product containing catalyst is then fractionated to form a relatively lower boiling fraction substantially free of catalyst and a relatively higher boiling fraction which contains substantially all of the catalyst withdrawn from the reaction zone with the liquid product.

By thus withdrawing finely divided catalyst from the reaction zone at the same rate at which catalyst is added thereto while maintaining a higher concentration of catalyst in the reaction zone, the activity of the catalyst in the reaction zone may be maintained substantially constant without the necessity for separate draw off and separation of catalyst.

While the catalyst thus withdrawn may if desired be separated from the liquid, it is preferred to fractionate the liquid product and allow the withdrawn catalyst to remain in the highest boiling fraction. As discussed below, it will frequently be possible to utilize a heavy fraction containing spent catalyst without further treatment, thus eliminaing any necessity for separation of catalyst from liquid.

For a better understanding of the invention reference should be had to the accompanying drawings in which.

Figure 1:
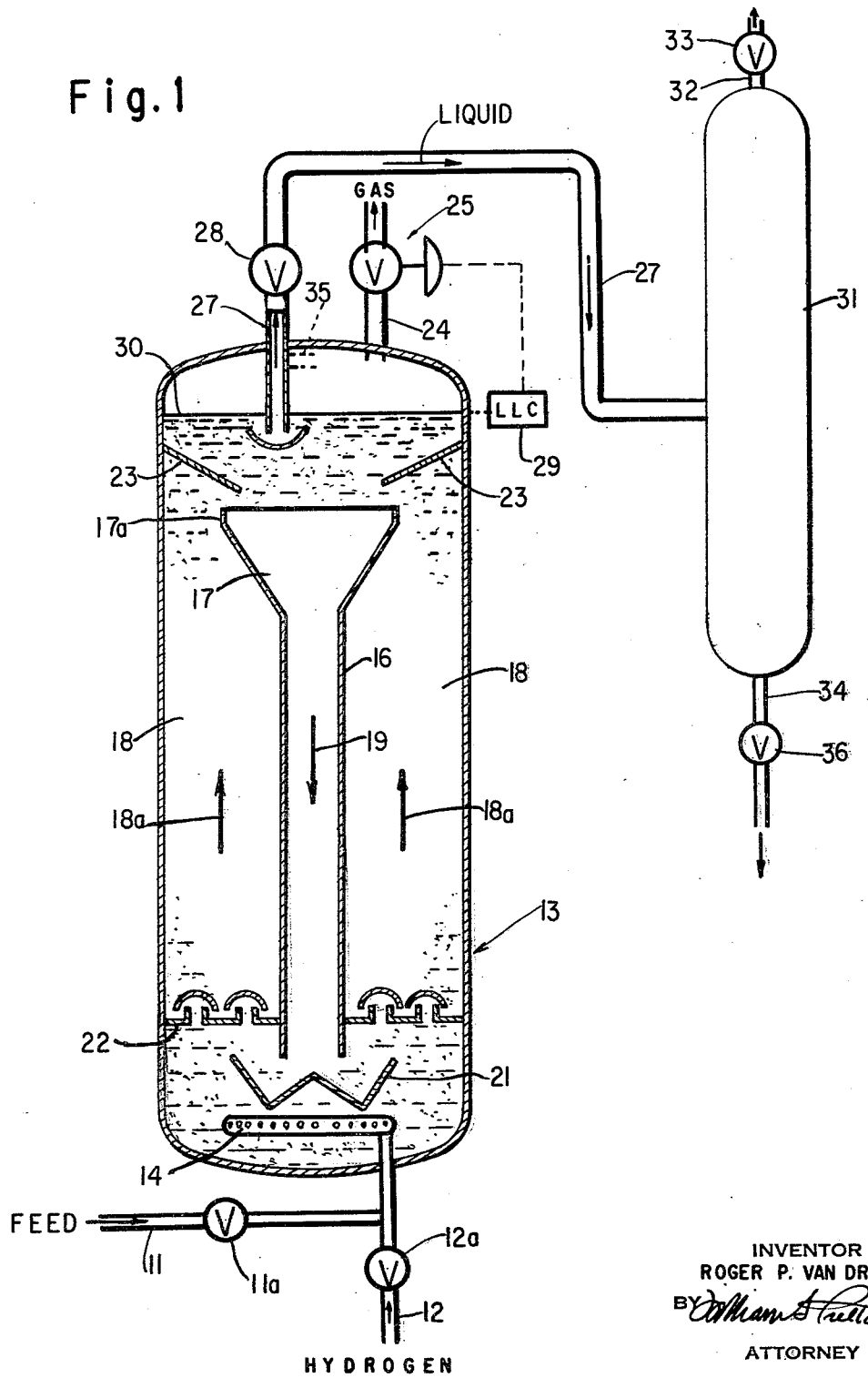
FIG. 1 is a somewhat diagrammatic illustration in which equipment is shown in elevation of a suitable arrangement of apparatus for treating hydrocarbon oil in accordance with a preferred embodiment of the invention.

Referring to FIG. 1, feed oil and finely divided catalyst entering through a conduit 11 and valve 11a and hydrogen entering through a conduit 12 and valve 12a are passed through the conduit 12 into the lower portion of a liquid treating vessel, shown here as a hydrogenation reactor 13. Hydrogen introduced through the conduit 12 may be pure hydrogen or may conveniently be hydrogen-containing gas such as recycle gas containing hydrogen as well as normally gaseous hydrocarbons and possibly inert gases such as nitrogen. Feed, catalyst and hydrogen may be distributed throughout at least a substantial portion of the cross section of area of the reactor 13 by suitable means such as a conventional distributing ring 14. The reactor 13 has suitable means such as a recycle conduit 16 positioned therein for recycling liquid and catalyst within the reactor. As shown, an upper portion 17a of the recycle conduit 16 preferably forms an enlarged gas disengaging zone 17 adapted to disengage gas from liquid being recycled. From the distributing ring 14, hydrogen, feed and fresh catalyst, together with recycle liquid and catalyst obtained from the recycle conduit 16, pass upwardly through a hydrogenation zone 18 as indicated by arrows 18a.

Suitable distributing means such as a conventional bubble cap tray 22 may be provided for insuring even distribution of reactor contents throughout the cross sectional area of the reactor. A recycle stream of liquid and catalyst passes downwardly through the recycle conduit as indicated by an arrow 19. Suitable deflecting means such as a recycle cup 21 are preferably provided for deflecting recycled liquid and catalyst in an upward direction for upflow through the reactor together with fresh feed and catalyst. As described in more detail below, it is desirable that the concentration of catalyst in the reactor be maintained as high as possible in relation to the concentration of catalyst in the feed and liquid product. To this end suitable deflecting means such as baffles 23 may be provided to aid in preventing unnecessary carry over of catalyst with withdrawn product. Concentration of catalyst in the reactor may also be increased by withdrawing liquid and gaseous product separately. Thus gaseous product, including unreacted hydrogen, may be withdrawn from the upper portion of the reactor 13 through a conduit 24 and valve 25 while liquid product may be withdrawn through a conduit 27 and valve 28. In order to achieve such separate drawoff of liquid and gas, a liquid level is preferably maintained near the top of the reactor, as indicated for instance at 30 by the use of suitable liquid level control apparatus such as 29 which may be utilized to control the liquid level by suitable means such as by controlling the operation of valve 25.

Liquid product withdrawn through the conduit 27 is preferably passed to suitable fractionating means shown in the drawing as a conventional fractionation tower 31. A relatively lower boiling fraction substantially free of catalyst particles is withdrawn in vaporous form through a conduit 32 and valve 33 and a relatively higher boiling liquid fraction containing substantially all of the catalyst particles withdrawn from the reactor with the liquid product is withdrawn from the fractionation tower through a conduit 34 and valve 36.

The feed introduced through the conduit 11 as described above may be any suitable hydrocarbon oil and may vary considerably depending upon the particular conversion reaction desired. Hydrogenation reactions may vary, for instance, from relatively mild treatments under relatively lower conditions of temperature and pressure through more severe treatments under relatively higher conditions of temperature and pressure. Mild treatment for example, may be used to achieve improved color or stability and is frequently used to treat relatively light oils such as gas oil. More severe treatment may be used to effect hydrodesulfurization or hydrocracking. Such treatments are more usually practiced on heavier feeds such as residual fractions.

The present invention is especially useful in the hydrocracking of heavy hydrocarbon oil in which at least a portion of the feed is converted into lighter material. For instance, the invention is especially useful in the hydrocracking of heavy hydrocarbon oil at least about 10 volume percent of which boils above about 975° F. to convert between about 30 and about 90 percent of such material boiling above 975° F. to material boiling below 975° F.

In such a process, the relatively high boiling fraction withdrawn from the fractionating tower through the conduit 34 is preferably the unconverted portion of the feed boiling above 975° F. Any suitable natural or synthetic catalyst may be employed in the reactor 13 in accordance with the invention described herein. Suitable hydrogenating catalysts, include, for instance, cobalt, iron, molybdenum, nickel, tungsten, cobalt-molybdate, etc. Such catalysts, as well as their sulfides and oxides, may be used alone or together with other suitable catalysts such as naturally occurring clays, silica, etc., or in combination with each other. Catalysts may be supported on suitable bases such as alumina, silica or silica-alumina. Such catalyst is present in the form of finely divided particles with catalyst particles in the size range up to about 300 microns, more usually between about 50 and about 150 microns, being most generally suitable. Such catalyst is introduced with the feed at a rate not exceeding about 0.5 pound of catalyst per barrel of fresh feed. Rates between about 0.02 and about 0.5, preferably between about 0.05 and about 0.2 pound per barrel are preferred. When a sufficient concentration of catalyst has built up in the reactor, catalyst will be carried out of the reactor with the liquid product at a rate equal to the rate at which it is introduced with the fresh feed. Under normal operating conditions this frequently results in the high boiling product withdrawn from the fractionating tower 31 through conduit 34 containing between about 0.1 and about 2.0 weight percent catalyst particles, more usually between 0.1 and about 1.0 weight percent. A high boiling product fraction of the type described above, boiling above about 975° F. and containing such amounts of catalyst is usually suitable for use as heavy fuel oil, but if necessary may be blended with oil from other sources to reduce the total solids content.

In order to obtain most efficient treatment with minimum reaction zone volume, the concentration of catalyst in the reaction zone should be substantially greater than the concentration of catalyst in the feed or liquid product streams and should generally be maintained as high as possible. When operating in the manner described herein, it is possible to build up a superficial catalyst concentration in the reaction zone to between about 10 and about 50 percent based on reaction zone volume, more usually between about 10 and about 30 percent. A number of steps may be taken to aid in obtaining maximum catalyst concentration in the reactor. For instance, recycling of a slurry of a catalyst and liquid as described above aids in maintaining maximum catalyst concentration in the reactor. While any suitable means for recycling liquid and catalyst may be utilized, it is preferred that recycle of liquid and catalyst, such as through the conduit 16, be produced by allowing a mixture of liquid and catalyst particles substantially free of gas to be recycled downwardly through the recycle conduit with the circulation being maintained by the difference in density between the material substantially free of gas in the recycle conduit and the mixture of liquid, catalyst and gas in the reaction zone. Thus, in FIG. 1, the mixture of liquid, gas and catalyst particles flowing upwardly through the reaction zone as indicated by arrows 18a is substantially less dense than the mixture of liquid and catalyst particles substantially free of gas being recycled through the conduit 16 as indicated by the arrow 19. The mixture of liquid, gas and finely divided catalyst may be flowed upwardly through the reaction zone 18 of the reactor 13 at any suitable velocity such as between about 3 and about 120 gallons per minute per square foot including both fresh feed and recycle. Likewise, a slurry of catalyst and liquid may be recycled through the conduit 16 at suitable rates such as between about 1 and about 60 times the volume of fresh feed introduced through the conduit 11. Recycle rates between about 5 and about 25 volumes of recycle liquid per volume of fresh feed are generally preferred. The velocity of liquid in the recycle conduit is preferably maintained between about 3 and about 10 feet per second.

In order to maintain catalyst concentration in the reactor 13 at the highest possible level, it is desirable to reduce to a minimum the amount of catalyst removed with liquid product relative to the amount of catalyst present in the reactor. As mentioned above, relatively higher recycle rates aid in this objective. The baffles 23 described above also aid in preventing unnecessary carry over of catalyst by tending to deflect catalyst into the gas disengaging zone 17 and recycle conduit 16 rather than allowing catalyst to be carried upwardly to the top of the reactor. One of the most effective ways found to reduce catalyst carry over with product is to withdraw liquid and gaseous materials from the upper portion of the reactor 13 separately rather than together. When gas and liquid are withdrawn together a large proportion of the carry over is due to the presence of the gas in the liquid. In the form of apparatus shown in FIG. 1, catalyst carry over due to the presence of gas in the liquid product is substantially eliminated. This is due primarily to the fact that catalyst is effectively disengaged from gas at the liquid level 30 due to surface tension effects and is not normally carried over in any significant quantities with the gaseous product removed through the conduit 24. While the separate withdrawal of liquid and gas substantially reduces catalyst carryover, it is apparent that if liquid is merely withdrawn through a conduit, such as the conduit 27 shown in the drawing, some of the gas will pass out of the reactor with liquid through the conduit 27 without first passing through the gas-liquid interface at the liquid level 30. Some catalyst being carried upwardly by the flotation effect of the gas in the liquid will thus not have an opportunity to become disengaged at the liquid level 30 and will be carried out through the conduit 27. This situation can be avoided by the use of suitable means such as a cup 37 to provide a gas disengaging zone at the intake to the conduit 37. Liquid drawn off through a conduit such as 27 which extends into such a gas disengaging zone will be substantially free of gas and carry over of catalyst with product will thereby be further reduced.

While the form of apparatus shown in the drawing described above shows gaseous product being withdrawn through a separate conduit 24, it is also possible to obtain the benefits of increased catalyst concentration and reduced catalyst carry over obtained by separate liquid and gas draw off by withdrawing gaseous product through the conduit 27, provided that a liquid level such as 30 is maintained and that gas is drawn off above this liquid level and liquid below. For instance, gas might be drawn off through a conduit 35 indicated in dotted lines in the drawing or through a hole in the conduit 27 above the liquid level 30 while liquid is drawn off through the lower end of the conduit.

Figure 2:
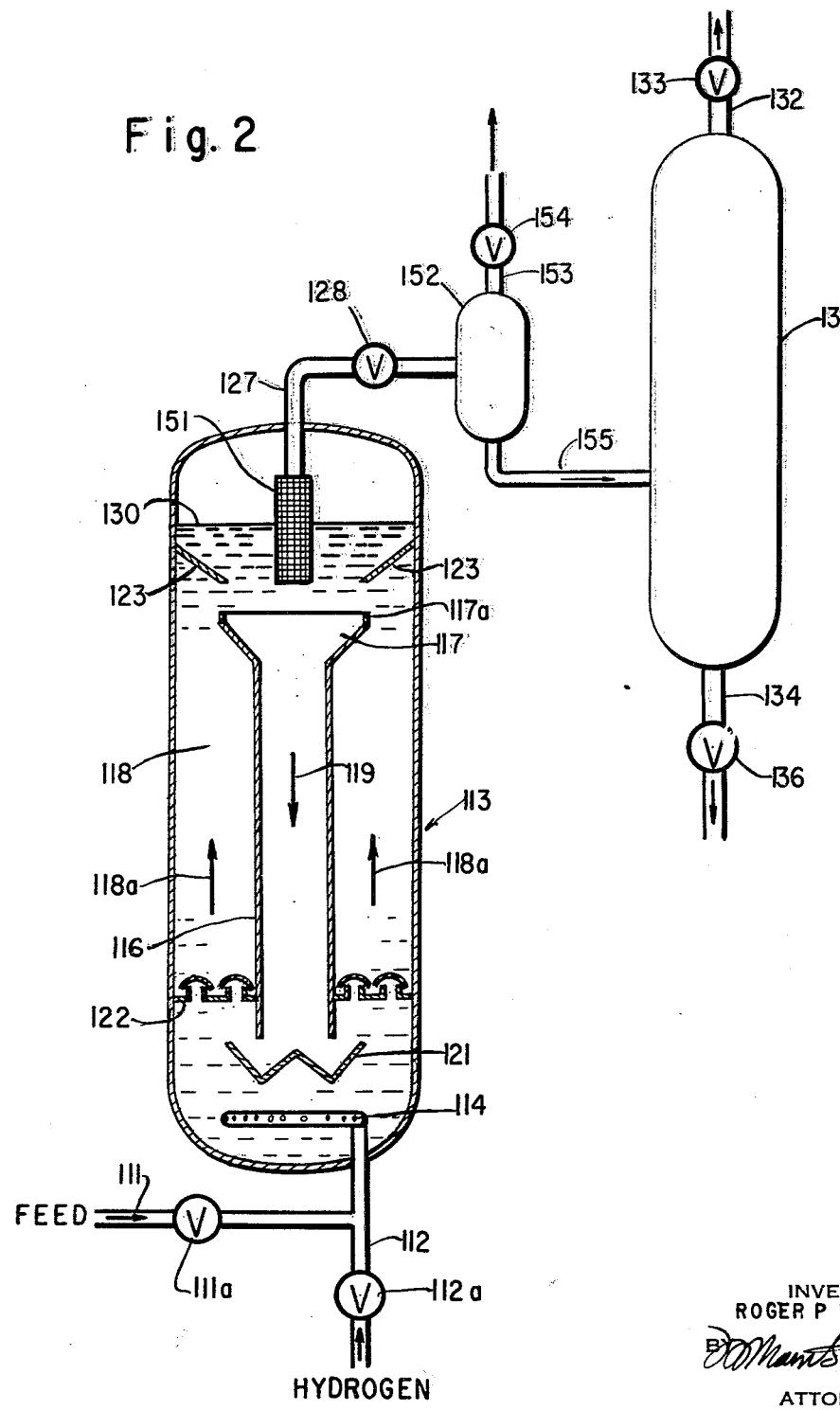
FIG. 2 is a somewhat diagrammatic illustration in which equipment is shown in elevation of another suitable arrangement of apparatus for treating hydrocarbon oil in accordance with the invention.

FIG. 2 shows an arrangement of apparatus generally similar to that shown in FIG. 1 but providing different means for controlling the liquid level within the reactor and for separately withdrawing liquid and gaseous materials from the reactor. Portions of the apparatus shown in FIG. 2 which correspond to similar portions of the apparatus of FIG. 1 are designated by numerals which are the same as those applied to the corresponding portions of the apparatus of FIG. 1 but are prefixed by the numeral 1. For instance, the recycle conduit 116 of FIG. 2 corresponds to the recycle conduit 16 of FIG. 1.

Referring to FIG. 2, feed oil and finely divided catalyst entering through a conduit 111 and valve 111a and hydrogen entering by a conduit 112 and valve 112a pass through the conduit 112 into the lower portion of a hydrogenation reactor 113. This material is preferably distributed throughout at least a substantial portion of the cross sectional area of the reactor 113 by suitable means such as a conventional distributing ring 114. The reactor 113 has suitable means, such as a recycle conduit 116, for recycling liquid and catalyst within the reactor. An upper portion 117a of the recycle conduit 116 preferably forms an enlarged gas disengaging zone 117 adapted to disengage gas from liquid recycled. From the distributing ring 114, hydrogen, feed and fresh catalyst, together with recycle liquid and catalyst obtained from the recycle conduit 116, pass upwardly through a hydrogenation zone 118 as indicated by arrows 118a. Suitable distributing means, such as a conventional bubble cap tray 122, may be provided for insuring even distribution of reactor contents throughout the cross sectional area of the reactor. A recycle stream of liquid and catalyst passes downwardly through the recycle conduit 116 as indicated by an arrow 119. Suitable deflecting means, such as a recycle cup 121, are preferably provided for deflecting recycled liquid and catalyst in an upward direction for upflow through the reactor together with fresh feed and catalyst. The reactor 113, like the reactor 13 of FIG. 1, may be provided with deflecting means such as baffles 123 to aid in preventing unnecessary carryover of catalyst with withdrawn product.

The apparatus of FIG. 2 differs from that of FIG. 1 primarily in the means provided for separate withdrawal of liquid and gas from the reactor 113. As shown in FIG. 2, both liquid and gaseous product from the reactor 113 pass through the conduit 127 and valve 128. Even though both liquid and gaseous material pass through the same conduit, they are withdrawn separately from the reaction zone. This is accomplished by the use of an elongated screen forming a portion of the conduit 127 which projects downwardly into the upper portion of the reactor 113. Such an elongated screen portion is shown in FIG. 2 as a screen 151 forming the lower end of the conduit 127. While the screen 151 is shown in FIG. 2 as being a cylindrical screen forming the lower end of the conduit 127, any screen arrangement having a vertical dimension may be used. The screen 151 may be of any suitable construction and have any suitable sized openings such as between about 40 and about 200 mesh. The openings in the screen need not be smaller than the catalyst particles. On the contrary, it is generally desirable that the openings in the screen be larger than the catalyst particles in order to prevent plugging of the screen. The purpose of the screen 151 is to achieve separate drawoff of gas and liquid from the reactor 113 and not to act as a filter.

By the use of a screen such as the screen 151 it is possible to make separate withdrawal of liquid and gas from the reactor without the use of any special liquid level control apparatus. As gas, liquid and catalyst particles pass upwardly through the reactor 113 to the upper portion thereof, the gaseous material forms a gas space at the top of the reactor. Since there is no outlet at the top of the reactor, the accumulation of gas and consequent increase in pressure at the top of the reactor forces the liquid level in the reactor down to, for instance, the point indicated by 130, thus forming a liquid level at some point along the vertical dimension of the screen 151. Gas then passes through the screen 151 into the conduit 127 through the portion of the screen above the liquid level 130 while liquid passes through the screen 151 into the conduit 127 through the portion of the screen below the liquid level. A small amount of gas, of course, passes through the screen 151 below the liquid level 130 together with the liquid. Some catalyst particles entrained with the liquid by gas flotation effects are thus carried out with liquid.

Since the only catalyst which can escape is that which passes through the screen 151 with the liquid and since only a very small fraction of the gas phase passes through this portion of the screen, the carryover of catalyst due to gas flotation effects is drastically reduced. The vast majority of the catalyst particles passing upwardly with liquid in the upper portion of the reactor 113 are disengaged from the gas at the liquid-gas interface at the liquid level 130 and fall back down for recycling through the conduit 116. Thus, for a given catalyst carryover, the concentration of catalyst in the reactor 113 is substantially increased.

Gas and liquid separately withdrawn from the reactor 113 through the screen 151 as described above are passed through the conduit 127 and valve 128 to a liquid-gas separating drum 152 from which gaseous material may be withdrawn as through a conduit 153 and valve 154. From the separating drum 152, liquid product is passed through a conduit 155 to suitable fractionating means such as a fractionating tower 131. A relatively lower boiling fraction substantially free of catalyst particles is withdrawn from the tower 131 as through a conduit 132 and valve 133 while a relatively higher boiling fraction, which contains substantially all of the catalyst particles withdrawn from the reactor 113, is withdrawn from the fractionation tower 131 through a conduit 134 and valve 136.

From the above discussion it is apparent that separate withdrawal of liquid and gas from the reactor may be accomplished in various ways such as by the use of apparatus such as that shown in FIG. 1 or by the use of apparatus such as that shown in FIG. 2. The decision as to which of these methods to use when it is desired to increase the concentration of catalyst in the reactor will usually depend upon the particular circumstances involved. For instance, if the overall system in which this invention is to be practiced is appropriate, it may be possible to eliminate at least one item of product separation equipment by not only withdrawing liquid and gas separately from the reactor but by making such withdrawal through two completely separate conduits (for example, by using apparatus of the type shown in FIG. 1).

On the other hand, by utilizing a vertically extending screen such as shown in FIG. 2, it is possible to dispense with the use of liquid level control apparatus which would normally be required for operation of the apparatus shown in FIG. 1.

In practicing the invention described herein in connection with the hydrocracking of heavy hydrocarbon oil of the type described above, any suitable operating conditions may be used. For instance, hydrogen may be introduced through the conduit 12 in quantities suitable to the particular reaction desired and may for instance be introduced at rates at between about 1,000 and about 10,000 standard cubic feet per barrel of feed with hydrogen rates between 3,000 and about 6,000 standard cubic feet per barrel of feed being preferred. Space velocity in the reactor 13 may vary considerably such as between 0.5 and about 6.0 volumes of feed per hour volume of reactor capacity with space velocities of between about 1 and about 3 volumes per hour per volume being preferred. Likewise, the reactor 13 may be maintained under a suitable pressure such as between about 500 and about 4,000 p.s.i.g. partial pressure of hydrogen with between about 1,000 and about 3,000 p.s.i.g. being preferred. Temperature in the reaction vessel may range between about 750 and about 950° F. depending upon the particular hydrogenation reactions desired and the other operating conditions chosen with temperatures between about 800 and about 900° F. being preferred.

It is generally desirable to maintain the temperature throughout substantially the entire reaction zone as close to the desired temperature as possible in any given situation. Due to the highly exothermic nature of many hydrogenation reactions, the normal tendency is for the temperature in the upper portion of the reactor to be considerably higher than that in the lower portion thereof due to the additional hydrogenation reactions taking place as feed rises through the reactor. Without substantial recycle of reactor contents the temperature difference in the reactor 13 might well be as much as 50 or 100° F. By recycling liquid and catalyst within the reactor as described above, the temperature difference can be substantially reduced. For instance, with recycle rates of about 20 to 1 based on fresh feed, the temperature difference in the reactor 13 would be only about 5° F. in a full size commercial unit. Reactor temperature may be controlled by any suitable means such as by control of the temperature of fresh feed introduced through the conduit 11.

While it is possible to obtain a certain amount of recycle as described above without the use of an enlarged gas disengaging zone on the upper end of the recycle conduit 16, the limiting factor in obtaining high recycle rates is usually determined by the size of the cross sectional area of the upper portion of the gas disengaging zone as compared with that of the reaction vessel. A disengaging zone of too small a size for the desired recycle rate may result in contained gas being carried down into the recycle conduit where smaller bubbles tend to coalesce into larger bubbles which then force their way upwardly through down flowing liquid and act to reduce the effective recycle rate. Also, the presence of gas bubbles in the recycle conduit tends to effect the overall concentration of gas in the recycle conduit and therefore the density of the material in the recycle conduit. If the overall concentration of gas in the recycle conduit rises too high, the net effect will be to decrease the density of the material in the recycle conduit thereby reducing the density difference available to produce or maintain circulation of the recycle stream through the recycle conduit. In the use of apparatus such as that shown in FIG. 1, it has been found that the cross sectional area of the gas disengaging zone such as 17 should be at least about 1/3 of the total cross sectional area of the reactor 13 at the same elevation in order to obtain preferred recycle rates.

It should be understood that if desired, such as when catalyst size or operating conditions do not permit recycling by reason of density difference as described above, conventional recycle equipment such as internal or external recycle lines and pumps may be used to obtain the desired recycle rates.

The following specific example illustrates the practical application of the present invention using process and apparatus similar to that shown in FIG. 1 and described above. For this run the feed is a heavy residual crude oil fraction having the following properties.

| | | |
|---|---|---|
| Gravity | ° API | 14.4 |
| Sulfur | wt. percent | 3.0 |
| Composition: | | |
| $C_1$–$C_3$ | | None |
| $C_4$–650° F. | | None |
| 650° F.–975° F. | vol. percent | 45 |
| Boiling above 975° F. | do | 55 |
| Total based on feed | do | 100 |

The feed is introduced into the reactor 13 together with 5,000 standard cubic feet of hydrogen per barrel of feed. The hydrogen is introduced in the form of a hydrogen-containing recycle gas stream containing approximately 75 volume percent hydrogen. The reactor 13 is maintained at a temperature of 830° F. and a total pressure of 3,000 p.s.i.g. with a hydrogen partial pressure of 2,250 p.s.i.g. The space velocity is 2.0 volumes of liquid feed per hour per volume of reactor space. Cobalt-molybdate hydrogenation catalyst is introduced with the feed at the rate of 0.02 pound of catalyst per barrel of feed. This catalyst has a size range of 50 to 80 microns. Catalyst concentration in the reactor 13 is 40 volume percent and a slurry of liquid and catalyst is recycled through the recycle conduit 16 at a rate 20 times of the rate of feed addition. Gaseous material is removed from the reactor 13 through the conduit 24 and liquid product is withdrawn through conduit 27. Catalyst is withdrawn with liquid product through the conduit 27 at the same rate at which it is added with the feed through the conduit 11. From the fractionating tower 31, product boiling below 975° F. is withdrawn substantially free of catalyst particles through the conduit 32 while product material boiling above 975° F. is withdrawn through the conduit 34 and contains substantially all of the catalyst withdrawn from the reactor with the liquid product. The total product from the reactor 13 has the following properties.

| | | |
|---|---|---|
| Gravity | ° API | 26 |
| Sulfur | wt. percent | 0.6 |
| Composition: | | |
| $C_1$–$C_3$ | do | 1.5 |
| $C_4$–400° F. | vol. percent | 17 |
| 400–650° F. | do | 22 |
| 650° F.–975° F. | do | 49 |
| Boiling above 975° F. | do | 17 |
| Total based on feed | do | 106.5 |

While the invention has been described above in connection with a preferred embodiment thereof, it will be understood by those skilled in the art that various changes and modifications may be made without departing from the spirit and scope of the invention and it is intended to cover all such changes and modifications in the appended claims.

I claim:

1. The process for hydrogenating hydrocarbon oil which comprises flowing said oil upwardly through a liquid phase reaction zone containing finely divided hydrogenation catalyst and added hydrogen while maintaining said reaction zone under suitable hydrogenation conditions to thereby hydrogenate at least a portion of said oil with simultaneous deactivation of catalyst, continuously adding catalyst to said reaction zone, separately withdrawing liquid and gaseous product from said reaction zone through a vertically extending screen positioned in the upper portion of said reaction zone so as to establish an upper liquid level in said reaction zone and permit separate withdrawal of liquid and gas through a common conduit, and withdrawing catalyst from said reaction zone with said liquid product at the same rate at which catalyst is added to the reaction zone to thereby maintain a desired level of conversion and a desired quantity of catalyst in said reaction zone, the concentration of catalyst in the reaction zone being substantially greater than the concentration of catalyst in the liquid product.

2. Apparatus for treating liquid with gas in the presence of finely divided solids which comprises: a treating vessel; means for introducing liquid, gas and finely divided solids into said vessel; and a withdrawal conduit extending into the upper portion of said vessel, said conduit having a vertically extending screen portion positioned so as to maintain an upper level of liquid in the vessel and permit gas and liquid to separately enter the conduit for withdrawal from the vessel.

3. Apparatus according to claim 2 in which the screen has openings larger than the average particle size of the finely divided solids to be used in the vessel.

References Cited by the Examiner
UNITED STATES PATENTS

| 2,944,961 | 7/60 | McAfee | 208—108 |
| 2,962,434 | 11/60 | Pohlenz | 208—112 |

OTHER REFERENCES

"Fluidization," Othmer, Reinhold Pub. Co., N.Y., 1956, page 132.

ALPHONSO D. SULLIVAN, *Primary Examiner.*